United States Patent [19]

Benaroya

[11] Patent Number: 4,873,822
[45] Date of Patent: Oct. 17, 1989

[54] ENERGY PRODUCING INSTALLATION WITH INTERNAL COMBUSTION ENGINE AND TURBINE

[76] Inventor: Henry Benaroya, 41 Boulevard du Commandant Charcot, 92200 Neuilly sur Seine, France

[21] Appl. No.: 171,428
[22] PCT Filed: Jul. 8, 1987
[86] PCT No.: PCT/FR87/00270
§ 371 Date: Mar. 4, 1988
§ 102(e) Date: Mar. 4, 1988
[87] PCT Pub. No.: WO88/00279
PCT Pub. Date: Jan. 14, 1988

[30] Foreign Application Priority Data

Jul. 9, 1986 [FR] France .............................. 86 10015

[51] Int. Cl.[4] .............................................. F02C 3/00
[52] U.S. Cl. .................................... 60/39.75; 60/595; 60/726; 60/729; 123/46 R
[58] Field of Search .................. 60/39.75, 39.142, 726, 60/729, 595; 123/46 R

[56] References Cited

U.S. PATENT DOCUMENTS

| | | | |
|---|---|---|---|
| 2,653,443 | 9/1953 | Mercier et al. | 60/595 |
| 2,711,719 | 6/1955 | Huber | 123/46 B |
| 3,118,434 | 1/1964 | Kosoff . | |
| 4,481,772 | 11/1984 | Benaroya | 60/595 |

FOREIGN PATENT DOCUMENTS

| | | |
|---|---|---|
| 3229940 | 6/1984 | Fed. Rep. of Germany ........ 60/595 |
| 3435732 | 4/1985 | Fed. Rep. of Germany . |
| 502165 | 2/1920 | France . |
| 913415 | 3/1946 | France . |
| 1078341 | 5/1954 | France . |
| 1437574 | 3/1966 | France . |
| 2533628 | 3/1984 | France . |
| 853183 | 11/1960 | United Kingdom . |
| 984939 | 3/1965 | United Kingdom . |
| 2057060 | 3/1981 | United Kingdom . |

OTHER PUBLICATIONS

"Supercharging the Internal Combustion Engine", E. T. Vincent, McGraw-Hill Book Co., Inc., 1948, pp. 287-297.

Primary Examiner—Michael Koczo
Attorney, Agent, or Firm—Fleit, Jacobson, Cohn, Price, Holman & Stern

[57] ABSTRACT

The installation comprises a compression unit and a power unit. The compression unit comprises at least one engine operation according to a Diesel cycle and supercharged by a turbine having an expansion turbine supplied with the exhaust gases of the engine and rotary compressor taking air from the atmosphere through a filter. The compressor delivers a primary supercharging flow to the Diesel cylinders via a cooler. The Diesel engine drives two compressors supplied with atmospheric air through the filter. One of the compressors provides a secondary flow to the power unit. The power unit comprises a combustion chamber which is supplied through the exchanger with part at least of the secondary airflow from the compression unit. The combustion chamber feeds a turbine producing on its shaft the whole of the output power. The Diesel type engine may be a conventional crank type engine or a free piston engine.

7 Claims, 6 Drawing Sheets

ENERGY PRODUCING INSTALLATION WITH INTERNAL COMBUSTION ENGINE AND TURBINE

The invention relates to energy producing installations including an internal combustion engine using the diesel cycle, generally two stroke, and a gas turbine, and in particular installations outputting mechanical power between a few MW and a few tens of MW.

At the present time, installations of this type are already in use, in which the gas turbine belongs to a turbocompressor for supercharging the Diesel engine, this latter delivering the output power. Installations have also already been proposed whose Diesel engine is of the crank-connecting rod or free piston type, associated with reciprocating or rotary compressors in which a combustion chamber receives a mixture of exhaust gas from the diesel and air coming from the compressors for feeding a power turbine which delivers all or part of the output power.

The invention aims at providing an installation of the above type answering better than those known heretofore the requirements of practice, particularly in that it allows a high efficiency, a reduced cost per unit of power and great modularity in the range of powers to be obtained at the same time.

To this end, the invention proposes an energy producing installation comprising:

a compression unit formed of at least one Diesel engine supercharged by a turbocompressor which delivers a primary airflow thereto, the excess energy which may be available at the shaft of the turbocompressor being used for increasing the energy produced at the shaft of the Diesel engine which drives reciprocating and/or rotary compressors delivering a secondary airflow, said compression unit being however advantageously formed in a privileged variant by at least one free piston module having two mobile assemblies formed of two opposed drive pistons each connected to a compressor piston, each compressor piston defining two compression units in a compressor cylinder, the drive pistons defining a two stroke Diesel engine chamber, which receives the air called primary airflow delivered by a primary compressor compartment at least, and whose exhaust gases feed the expansion turbine of a turbocompressor having advantageously a primary rotary compressor body supercharging the so called primary compressor compartment or compartments and at least a secondary rotary compression body supercharging that one (or those) of the so called "secondary" compression compartments which do not supercharge the two stroke Diesel engine chamber;

and a power unit including a gas turbine which delivers the whole of the output power at its shaft, itself fed by a combustion chamber which receives all or the major part of the air coming from the secondary compressor compartments or secondary flow.

The module—or each module—of the installation must be provided with a regulating system providing:

control of the amplitude of the stroke of the mobile assembly towards the outside, i.e. of the outward dead center or PME;

control of the amplitude towards the inside, i.e. of the inward dead center or PMI;

control as a function of the power demanded.

The regulation will comply with the above hierarchy; when the installation includes several modules, the system should in addition maintain the phase of all the modules except one (slave modules) with respect to another module taken as reference.

With this arrangement, a great constructional flexibility due to the modular construction is obtained, as well as high efficiency of the compression unit, due more particularly to the direct mechanical connection between drive pistons and compressor pistons, and a reduced specific cost per KW, due particularly to the suppression of the conventional connecting rod assembly of a Diesel engine and of the compressor driven by the turbine (and which entails the power of this latter being multiplied by 2.5) in the case of a conventional gas turbine installation. To sum up, the invention makes it possible to associate the low specific price per kw of the gas turbine with the high thermal efficiency of the diesel, while eliminating to a large extent the drawbacks which the two approaches have when taken separately.

It should further be noted that the absence of a combustion chamber receiving the exhaust gases from the Diesel engine makes it possible to completely decouple the supercharging pressure of the Diesel engine from the inlet pressure of the turbine, so to choose optimum values for one and the other and to maintain good efficiency on partial load.

In an advantageous embodiment, the mobile assembly also defines a variable volume cavity in which reigns a counter air-pressure opposing the expansion stroke of the drive pistons and the regulating system is provided for regulating the counter pressure as a function of the power demanded.

Regulation of the PME may be provided by controlling the amount of fuel injected and that of the PMI by diverting an airflow from the primary cycle flowing through the Diesel engine to the secondary cycle flowing through the power unit.

The mobile assemblies of the free piston module (or of each module) are linked together in the usual way by a synchronization system so that their movements remain equal but of opposite directions during the diesel cycle, but this synchronization system may advantageously assume the form of a hydraulic connection described further on.

The invention will be better understood from reading the following description of an advantageous embodiment of the device of the invention. The description refers to the accompanying drawings in which only FIG. 1 relates to an embodiment in which the compression unit is based on a crank-connecting rod Diesel engine, all the other FIGS. relating to the case where the compression unit compression unit is based on a diesel module with free pistons, it being understood that the use of a secondary airflow in the power unit is the same in both cases.

Under these conditions:

Figure 1:
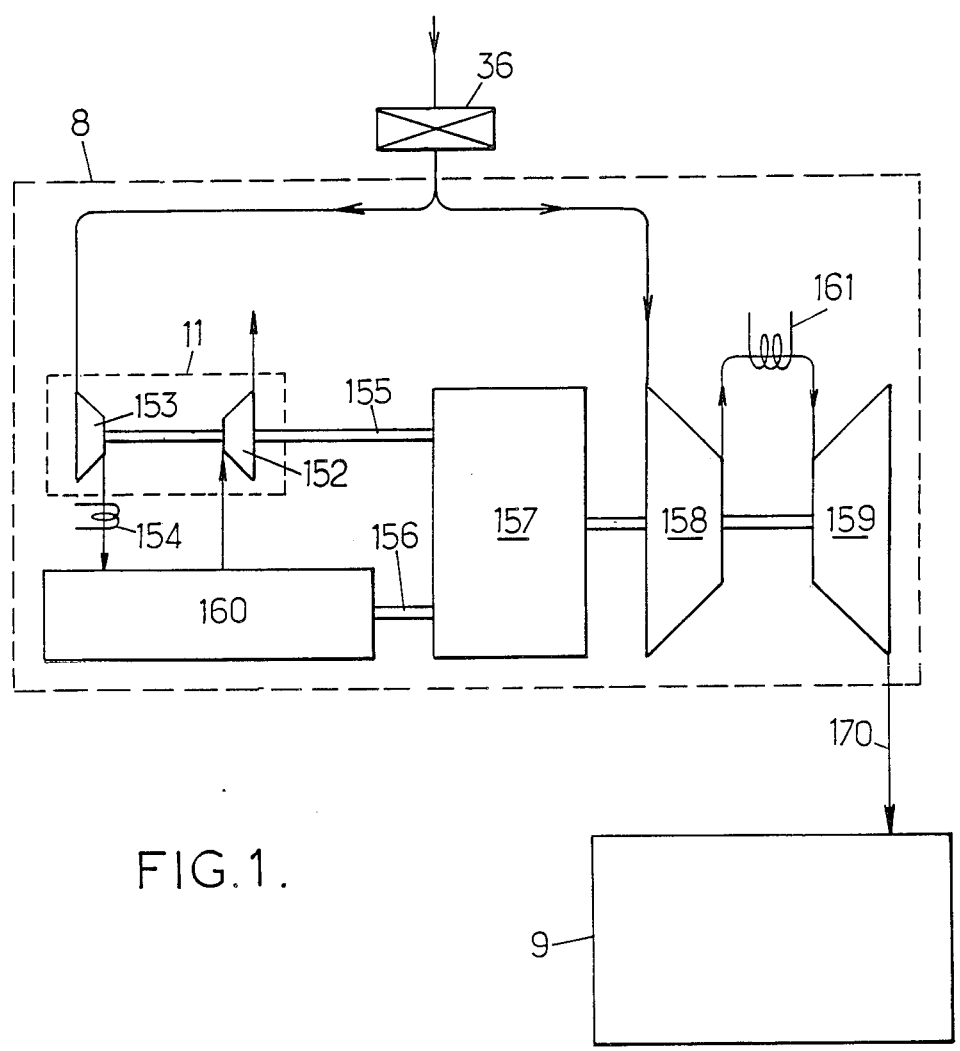
FIG. 1 is the diagram of the compression unit of a dual flow installation including a highly supercharged crank-connecting rod Diesel engine, forming a first embodiment of the invention.

The diagram of FIG. 1 shows a dual flow installation which includes a compression unit 8 and a power unit 9. The compression unit is formed of a crank-connecting rod Diesel engine 160 supercharged by a turbocompressor 11 formed of an expansion turbine 152 and a rotary compressor 153. The turbine 152, with one or more stages, is fed with the exhaust gases from the Diesel engine and drives the rotary compressor 153 sucking in the atmospheric air through a filter 36 and supercharging the cylinders of the Diesel engine through a cooling heat exchanger 154. Shafts 156 and 155 of the Diesel engine 160 and of the turbocompressor drive two rotary compressor bodies 158 and 159 through a step-up gear 157. The first body 158 sucks in the atmospheric air and feeds the second body 159 through a cooler 161. The second body delivers a compressed air flow 170 to the power unit 9.

The power unit 9 may be similar to the one shown in FIG. 2, which will be described further on, and includes a power gas turbine driving the load (alternator for example).

Figure 2:
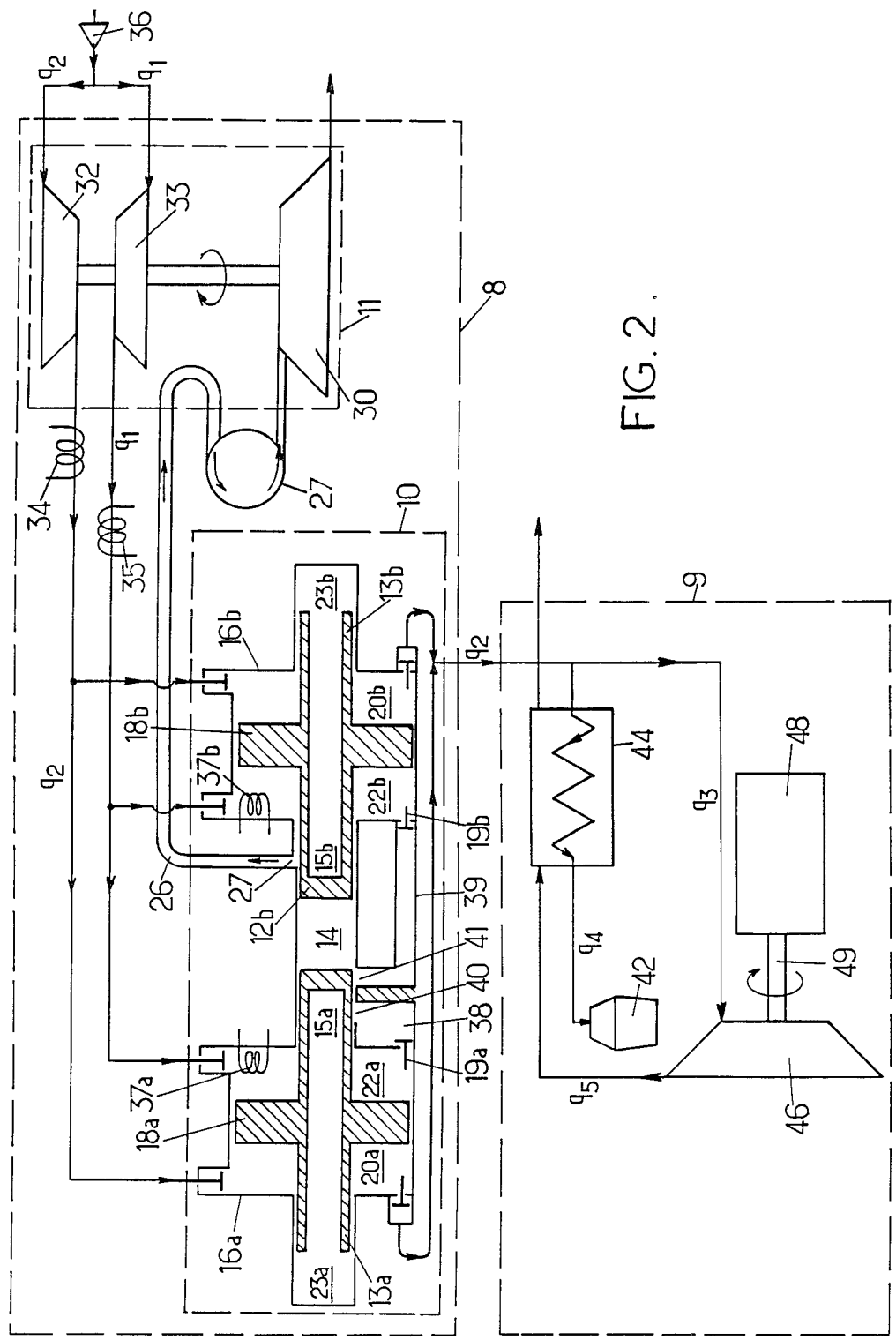
FIG. 2 is a diagram of the gas flow in an installation constructed from a free piston diesel module according to one embodiment of the invention.

The installation shown in FIG. 2 forms a particularly advantageous version of the invention. It may be regarded as formed of a compression unit 8 and a power unit 9.

The compression unit includes one or more modules 10 of the free piston type. Each module has an engine with two opposed pistons 12a and 12b defining a two stroke Diesel chamber 14 and two double-acting compressor cylinders 16a and 16b. Each compressor cylinder is divided by a respective compressor piston 18a or 18b into an external compartment 20a or 20b and an internal compartment 22a or 22b.

A primary thermodynamic circuit belonging as a whole to the compression unit 8, includes, from the exhaust ports 27 of the combustion chamber 14 of the Diesel engine, at least one duct 26 for feeding the exhaust gases to the expansion turbine 30 of a supercharging turbocompressor 11, through an aerodynamic tranquillizing volume 27. The rotary compressor 32, coupled to turbine 30, is fed with atmospheric air through a filter 36. It belongs to a secondary supercharging circuit proper to that one or those of the compressor compartments which feed the power unit, to which it delivers the secondary flow Q2. In the case shown in FIG. 2, it is the two external compartments 20a, and 20b of the compressor cylinder 16a and 16b, to which the rotary compressor 32 is connected by means of a cooler 34.

A second rotary compressor 33 coupled to turbine 30 is also fed with atmospheric air through the filter 36. It belongs to a primary supercharging circuit proper to the one (or those) of the compressor compartments which feed the Diesel engine chamber 14, to which it delivers the primary airflow Q1. In the case shown in FIG. 2, it is the two internal compartments 22a, and 22b of the compressor cylinder 16a and 16b to which the rotary compressor 33 is connected through a cooler 35.

On full load, the secondary airflow Q2 is very much greater than the primary airflow Q1, for example Q2=3Q1.

The arrangement of the intake and scavenging ports 40 and 41 of the Diesel engine 14 is advantageously that described in the patent application Ser. No. FR 85 13 480 of the applicant: a row of ports 41, the first to open during the outward movement of the piston 12a, is slanted with respect to the axis of the engine so as to create a rotary mouvement of the air, called "swirl". It is fed by that one of the internal compressor compartments 22b which is the furthest away from the intake ports, through at least one cooler 37b placed advantageously wholly or partially in the dead space of the compartment 22b, before the delivery valves 19b of this compressor compartment 22b. Between compartment 22b and the row of ports 41 the compressed air passes through at least one intake pipe 39 whose length is adapted so as to create an intake delay.

The row of ports 40 which are last to open during the outgoing mouvement of piston 12a is fed by the internal compressor compartment 22a the nearest to the intake ports, through at least one cooler 37a, placed advantageously wholly or partially in the dead space of compartment 22a, for the delivery valves 19a of this compression compartment 22a while passing through at least one intake capacity 38.

The two mobile assemblies 15a and 15b, each formed of a drive piston and a compressor piston each have an extension 13a or 13b which defines in the frame of the module a variable volume 23a or 23b, called counter pressure volume. These variable volumes are advantageously identical and advantageously have a diameter of the same order of size as that of chamber 14. The pressure which reigns therein, and which is adjustable by means of a circuit not shown, opposes to the expansion stroke of the drive piston a force which increases with the pressure. It is advantageously between 20 and 50 bars for the usual installations.

As will be seen further on, the air pressure in volumes 23a and 23b can be used as parameter for adjusting the PME (external dead center) and/or the phase shift between the modules in the case of a multimodule installation: however, as will be seen further on, the phase shift may be adjusted by adjusting the injection advance.

The pressurized air in volumes 23a and 23b further forms a cushion for transferring to the drive pistons, during compression, a part of the energy accumulated during expansion. Finally, this pressurized air may be used for cooling the drive pistons.

The power unit 9 comprises a heat exchanger 44, a combustion chamber 42 and a power gas turbine 46, through which the secondary airflow coming from the compartments of the compressor compartments 20 and 20b flows through in this order.

In exchanger 44, a fraction Q4 of the airflow Q2 coming from the compression unit is heated by a flow Q5 of expanded gases in turbine 46. Another fraction, Q3, of the secondary airflow may be advantageously used for cooling, if required, the first stages of turbine 46.

The combustion chamber 42 is fed with fuel of the type normally used in industrial gas turbines (heavy distillates, gas oil, natural gas, gas from cold distillation, etc).

Finally, the shaft 49 of turbine 46 is coupled to a rotary machine generating useful electric or mechanical energy 48, such as an alternator, a compressor or a pump.

The general construction of the different machines which are incorporated in the installation will not be described, here, for it has been described in prior patents of the applicant, but only the arrangement for cooling the drive pistons and the regulating means, as well as the arrangement for synchronizing the movement of the two mobile assemblies 15a and 15b.

By way of example, it may however be mentioned that the pressures, temperatures and flow rates may be the following for an installation comprising a single module of a few MW:

power unit
Mass flow rate q2: about 6.5 kg/s
Input temperature into the exchanger 44, 575° C. for the combustion gas expanded in the power turbine 46 and 175° C. for the air at 10 bars at the input to the combustion chamber 42.
  compression unit
  Engine bore of the free piston module: 250 mm
  Compressor bore of the free piston module: 625 mm
  Supercharging of the Diesel engine 14:7 bars,
  Mass flow rate q1: about 2 kg/s
  Beat frequency: about 10 Hz
  Air at the input of the turbine 30 of the
  turbocompressor: 6 bars at 600° C.
  Compression rate of the compressor 32: 3.5/1
  Compression rate of the compressor 33: 1.8/1
  Efficiency at the shaft of turbine 46: 47 to 50% at full load.

Figure 3:
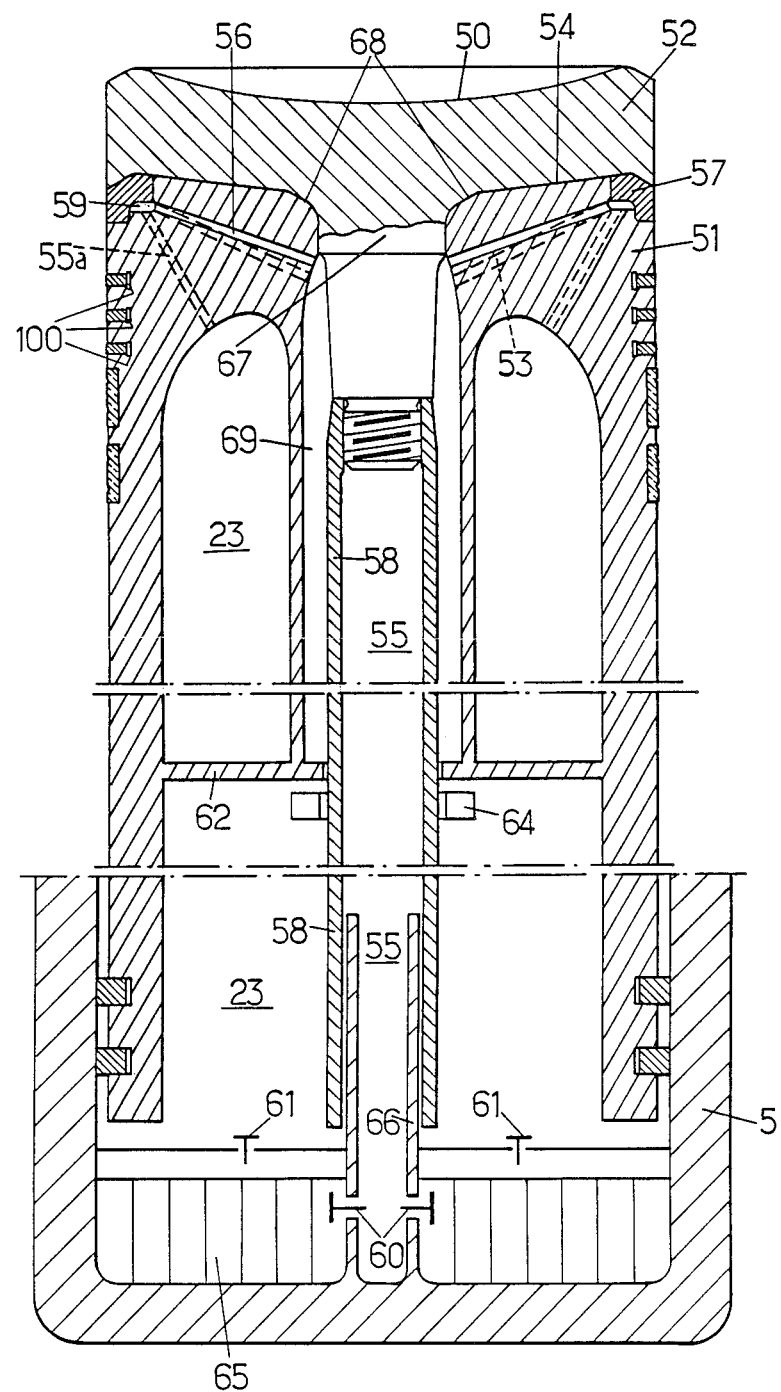
FIG. 3 is a simplified sectional view showing a circuit for cooling the drive pistons usable in the installation of FIG. 2.

Cooling of the drive pistons 12 is advantageously provided by heat transfer with the air coming from the counter pressure volumes 23 which communicate with volumes internal to the pistons. To attain this result, the head of the drive pistons can be constructed as shown in FIG. 3, which takes into account the fact that the two stroke Diesel engine chamber, in this type of installation, is fed with fuel of the type normally used in industrial gas turbines, like the combustion chamber 42 of the power unit 9; because of this use, the temperature of the wall of the piston which is in direct contact with the diesel combustion chamber 14 may be allowed to rise to relatively high values.

The piston head 51 has thereover a stainless steel heat shield 52 whose skin 50 may reach temperatures of 700° C. The heat shield has a cylindrical appendix 67 fitted in the piston head and tensioned by a tube 58 fixed by a nut 64 on the spacers 62 inside the piston.

The piston head is pierced with a series of cooling air intake channels 55a and air discharge channels 56. A duct 59 formed by a screwed or welded ring 57 places channels 55a and 56 in communication. The cooling air arrives through the annular volume 23 (volume 23a or 23b in FIG. 2) into the piston head, passes through channels 55a, duct 59 and channels 56, then escapes through an annular volume 69 and, through a series of slits or holes, reaches the inside 55 of tube 58. Drain channels 53 place duct 59 in communication with a location downstream of the flow.

Shield 52 and piston head 51 are separated, over a part of their contact surface, by a slit 54, of a few hundredths of a millimeter when hot. This slit provides an additional heat resistance between the shield and the piston head because of the air which flows therein during movement of the piston. Thus excellent cooling of the piston head is obtained in the zone of the segment grooves 100. A perfect contact however remains provided in the central zone 68 for the transmission of the pressure and inertial forces.

The cooling air from the counter pressure volume 23 arriving through channels 55a and 56 is caused to flow by the very movement of the piston because of a set of valves 60 and 61 situated on each side of a cooling exchanger with water circulation 65. The valve-cooler assembly may be fixed to frame 59 and fed through a fixed tube 66 sliding inside tube 58.

In order to synchronize the two mobile assemblies and to allow swivelling thereof when stopped, free piston installations generally comprise mechanical means (racks and toothed wheel, Nuremberg scissors, endless screw, etc). In the installation shown in FIG. 4, these means are replaced by at least one hydraulic system.

Figure 4:
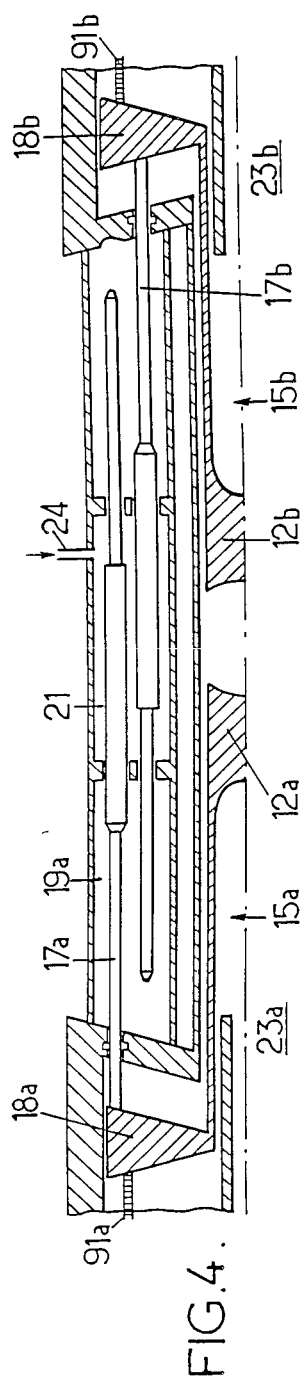
FIG. 4 is a schematical view of an advantageous hydraulic system for synchronizing the movements of two mobile assemblies of a free piston module, usable in the installation of FIG. 2.

The compressor pistons 18a and 18b of the mobile assemblies 15a and 15b shown in FIG. 4 comprise respective plunger pistons with differential sections 17a and 17b, plunging into two sealed hydraulic chambers 19a and 19b, fed during operation for offsetting the possible leaks from a regulation circuit driven by stroke sensors 91a and 91b.

In the case of dissymmetry of forces on the mobile assemblies 15a and 15b, this system creates in chambers 19a and 19b a differential hydraulic oil pressure which tends to reestablish synchronization of the movements of the mobile assemblies.

When stopped, the mobile assemblies can be "forced" outwardly by admitting pressurized oil 24 into the central seal hydraulic chamber 21, emptied before start up. Inward "forced movement" can be achieved by delivering pressurized air to cavities 23a and 23b. A loop (not shown) is then provided for adjusting the movement oil and movement air pressure so as to provide smooth movement in both directions.

The system for regulating an installation of the type which has just been described must, in the hierarchical order of the functions:

(1) control the amplitude of the outward stroke, that is to say the position of the PME, by rapid regulation (time constant of 20 ms for example), (2) control the amplitude of the inward stroke (PMI) by semirapid regulation (1 ms) for example, (3) if the installation has N modules with a phase shift of 2 n/N, to maintain the correct phase between the N modules, with a slow response time with respect to that of the preceding regulators (10 s for example), (4) follow the power demanded on the shaft of turbine 46, with an equally long response time (10 s for example), The construction of the circuits for fulfilling these functions will now be described.

Regulation of the outward stroke

This regulation must be made cycle by cycle and uses the position of the PME as the input parameter and the amount of fuel injected as control parameter. Its purpose is to maintain the real position of the PME at a reference value depending on the load. To obtain this result, it is important to adjust the control parameter (injection "notch" at the pump) with as small a delay as possible after measurement of the input parameter; it is then suitable to effect the required correction for the injection which simply follows the measurement, within a delay not exceeding 35% of the cycle time.

To attain this result, it is advantageous for the corrections to have been made to be always in the direction of an increase of the notch. However, in order for it to be possible to reduce as well as increase the notch with respect to the preceding cycle, the device of the invention systematially carries out, on injection, the maxium reduction which may be necessary from one cycle to another. The correction which may be required is then always of positive sign.

Figure 5:
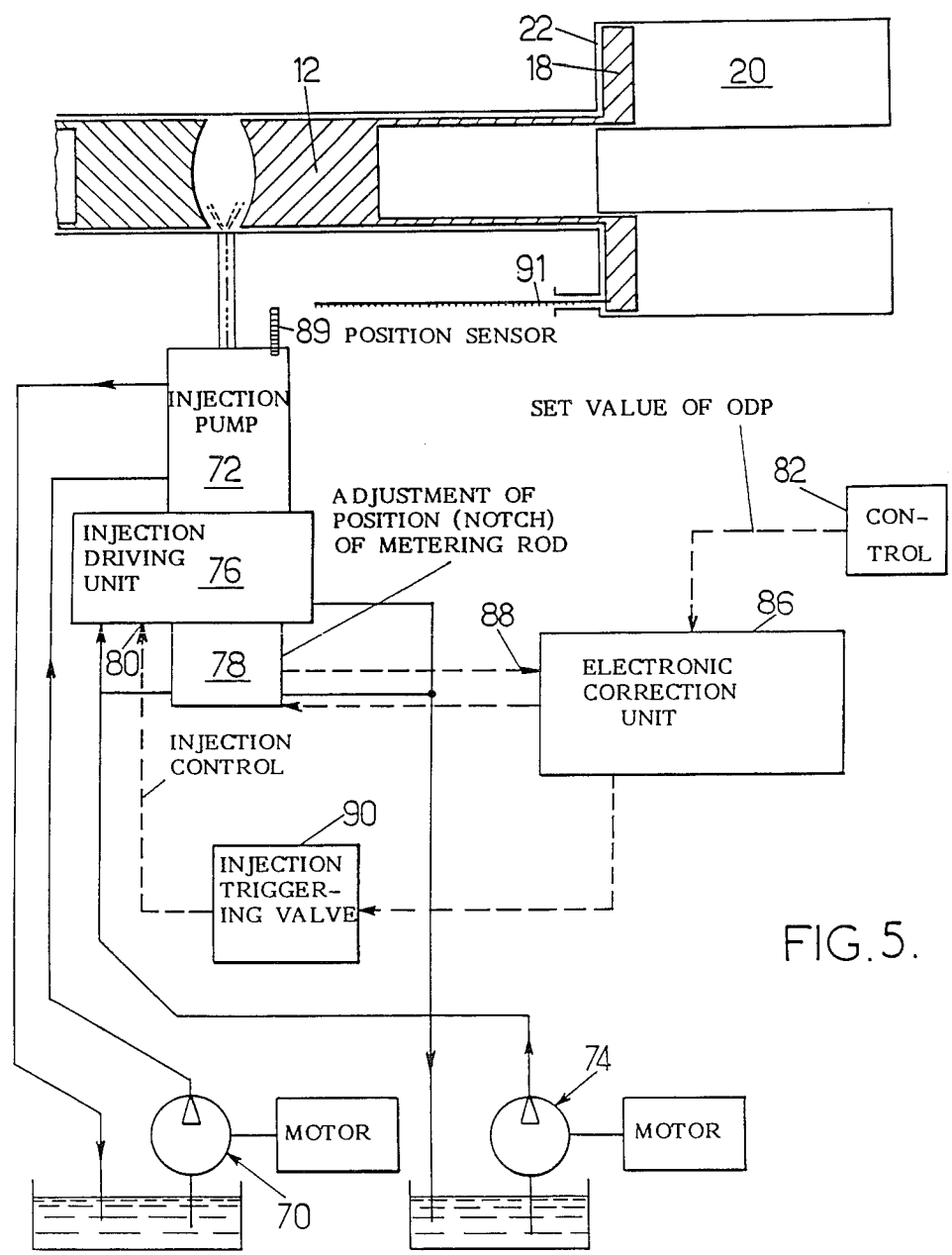
FIG. 5 is a block diagram of a PME regulation system usable in the installation of FIG. 2.

The device may be constructed as shown in FIG. 5, and include a fuel circuit which has a low pressure motor driven fuel pump 70 and an injection pump 72 and a power hydraulic circuit formed of a high pressure pump 74 and an injection drive unit 76 having an electric notch adjustment circuit 78 and an injection control input 80.

The regulating circuit properly speaking is of digital type. It includes a control desk 82 which delivers a PME reference value. The real value of the PME is delivered by a digital position sensor 91 which may also deliver the real PMI value and, for initiating injection, pulses on passage of the mobile assembly and its speed. This latter information forms data from which an electric unit 86 determines the correction to be made at the time of injection. The notch adjustment unit 78 has incremental operation and may include a stepper motor coupled to a hydraulic pump. It includes a position sensor 89 which delivers a signal of the effective value of the notch for each injection to an input 88 of unit 86.

The injection order is delivered by unit 86 to an injection initiation valve 90 which forms an electric-hydraulic conversion device with amplification delivering the injection order pulse to the drive unit 76.

Figure 6:
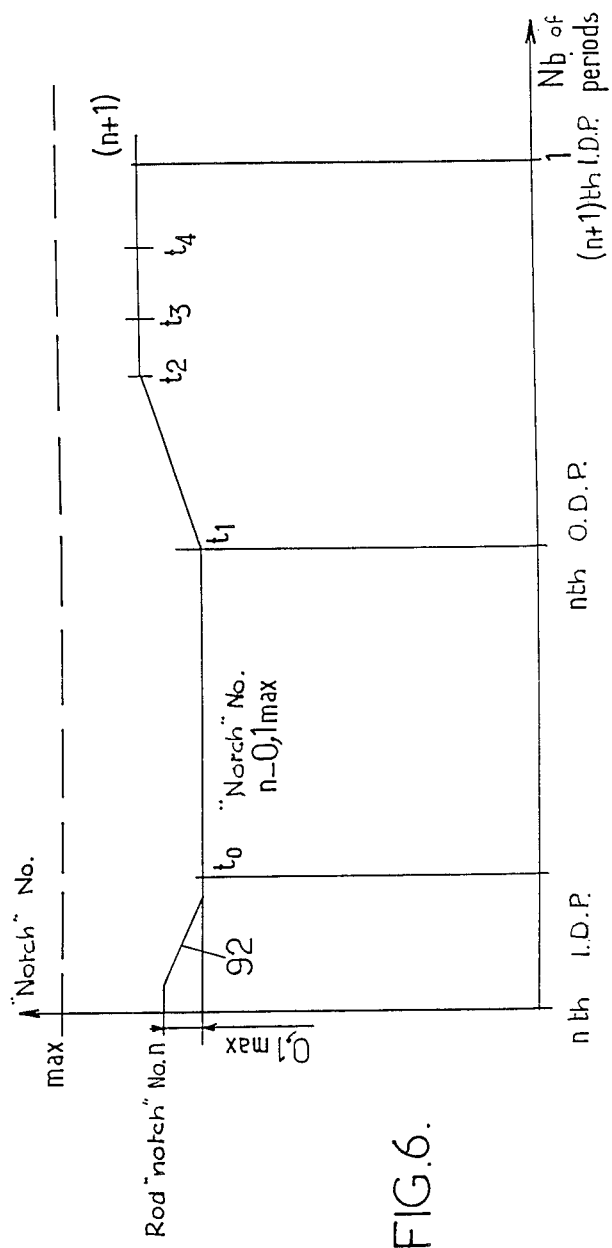
FIG. 6 is a diagram showing the method of controlling the rack "notch" used in the system of FIG. 5.

The mode of action of the regulating device is clear from FIG. 6. The preventive reduction of the notch after the nth passage through PMI appears at 92. Then the following occur:

from $t_0$ to $t_1$ (passage to PMI), the processing of the data, following which the new value of the PME is acquired, from $t_1$ to $t_2$, the new adjustment of the value of the notch, by holding or increase, from $t_2$ to $t_3$, a time which remains available, until the beginning of injection, from $t_3$, injection, at $t_4$ passing to PMI, also detected and measured.

Regulation of the PMI

Figure 7:
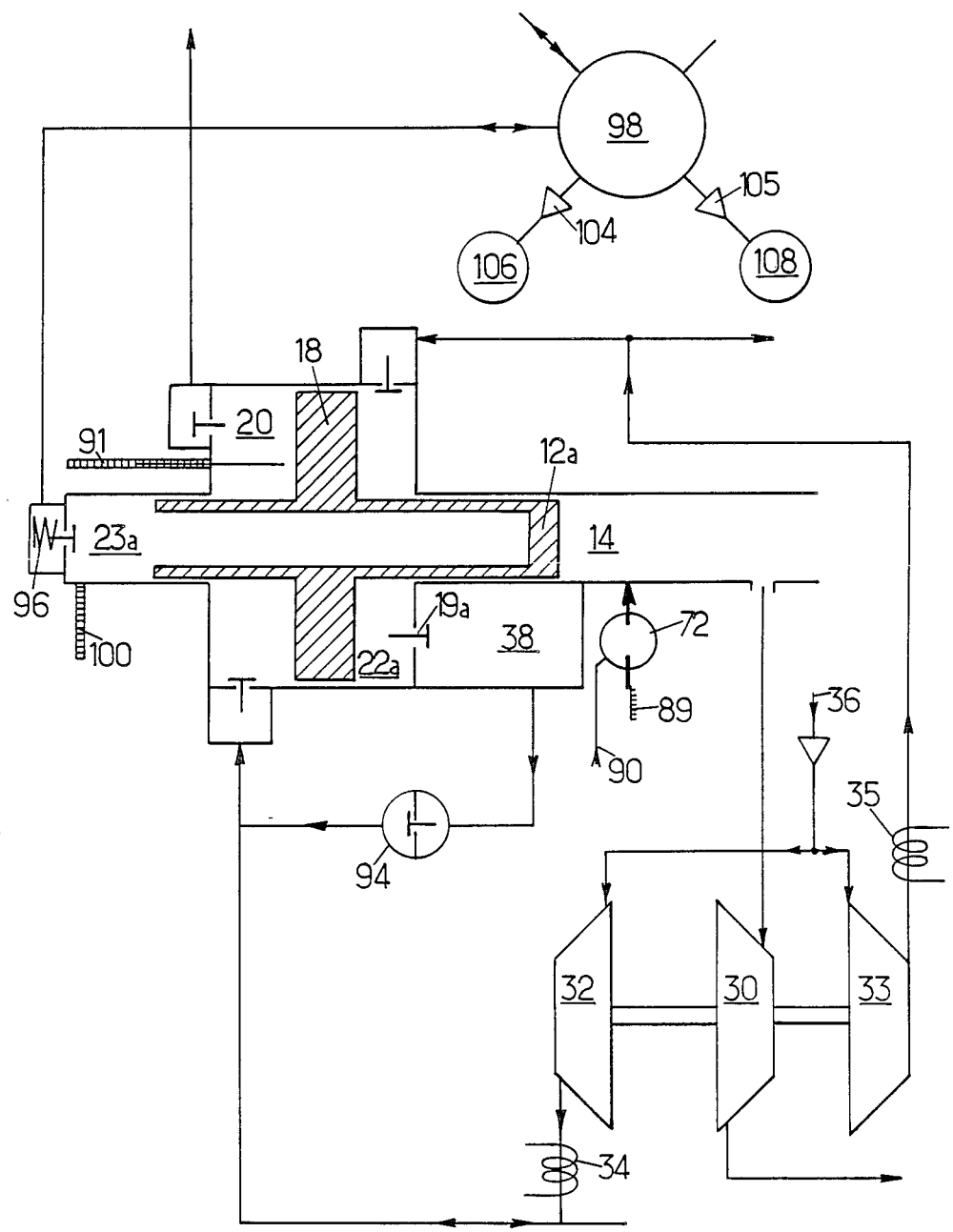
FIG. 7 is a block diagram of the regulation as a function of the load, and as a function of the phase, in the case of a multimodule installation.

It should be noted that the pressure $P_1$ reigning in the intake passage 38 of the Diesel engine 14, i.e. at the outlet of the primary compressor compartments, is, at all speeds, kept at a value greater than that of the pressure $P_2$ reigning at the outlet of the rotary compressor 32, i.e. at the input of the internal compressor compartments. Under these conditions, the PMI may be regulated, in accordance with the device shown schematically in FIG. 7, by diverting primary airflow to the secondary circuit by means of a valve 94 connecting the intake capacity 38 associated with one of the external compressor compartments 22 to the output of the rotary compressor 32. Valve 94, controlled by the measurement of the PMI 91, is closed on full load; on partial load, opening thereof causes a reduction of the PMI by reduction of the pneumatic resistance of the primary compartments 22a and 22b; its closure causes an increase of the PMI by an increase of this pneumatic resistance.

Adjustment of the relative phase of the modules

Slight variations of the injection advance make it possible to modify the beat frequency of the mobile assemblies. Since moreover, in an installation with N modules, it is desirable to phase them with each other by maintaining a regular phase shift of $2n/N$, this regular phase shift is advantageously maintained by choosing a master module. The electronic unit 86 then makes a comparison between the time at which the master module passes to the PMI and that of the other modules (slave modules) to which a phase shift $k \times 2n/N$ ($k=1, 2, \ldots N-1$) is respectively assigned and acts consequently on the injection advance.

Another way of obtaining the phase shift of the slave modules is by adjusting the counter pressure reigning in volumes 23.

Adaptation to the load demanded on the shaft of the turbine of the power unit

Adaptation to the load demanded by the network on the shaft of the power turbine is provided, in accordance with the diagram of FIG. 5, by adjusting the counter pressure reigning in volumes 23, as a function of a measurement 100 of this counter pressure.

In an installation with N modules, the 2N counter pressure volumes 23 are connected together by a common capacity 98, which may be, on a demand from the network, fed with compressed air by a capacity 106 through a pressure reducer 104 or discharged into a capacity 108 through a pressure reducer 105. An electrovalve 96, controlled by passing to the PMI measured by sensor 91, places each capacity 23 for a short time in communication with the common capacity 98 so as to establish therein by discrete increments the counter pressure corresponding to the external load demand. These variations of the counter pressure modify the PMI of the mobile assemblies and thus cause adaptation of the fuel notch to the load in accordance with the above described method of regulating the PME.

What is claimed is:

1. Energy producing installation comprising:
    a compression unit including
        at least one Diesel cycle free piston module, having two rectilinearly movable assemblies each formed of a Diesel piston and a compressor piston, the compressor pistons each defining two compressor compartments and said compressor compartments consisting of internal primary compartments and external secondary compartments, and the Diesel pistons defining a Diesel chamber, and
        turboblower means for supercharging said module, having an expansion turbine fed with the exhaust gases of the Diesel chamber, a primary rotary compressor driven by said expansion turbine, connected to receive atmospheric air and to deliver a primary air flow to said internal primary compartments and a secondary rotary compressor connected to receive atmospheric air and to deliver a secondary air flow to said external secondary compartments, and
    a power unit including
        combustion chamber means having an air inlet connected to receive part at least of the secondary air flow from said external compartments, and
        turbine means having a rotary power shaft delivering the output power of said installation and having an input connected to receive combustion gases from said combustion chamber.

2. Installation according to claim 1, further comprising heat exchanger means for heat exchange between the exhaust gases from the turbine of the power unit and the secondary air flow delivered to said combustion chamber means.

3. Installation according to claim 2, further comprising means for deriving a small fraction of the secondary air flow delivered by said external compartments to said turbine for cooling at least one stage thereof.

4. Installation according to claim 1, wherein said Diesel engine has a first row of intake and scavenging ports located on one side of the Diesel chamber and a second row of intake and scavenging ports located on the same side of the Diesel chamber with respect to the center of the Diesel chamber, the first row being located closer to the center than the second row; intake pipe means connecting the ports of the first row to the internal primary compartment which is furthest away from said first row and a buffer capacity communicating the ports of the second row with an outlet of the internal primary compartment located closest to the ports, cooler means being provided on the path of the primary air flow from said primary rotary compressor to said Diesel chamber through said internal primary compartments.

5. Installation according to claim 4, comprising several free piston modules, characterized in that each module has an individual regulation system ensuring monitoring and control of the amplitude of the outward stroke of the mobile assemblies with a low time constant, occurring from the measurement of the outer dead point (PME) by acting on a fuel pump delivery stroke;

monitoring and control of the amplitude of the inward stroke of the mobile assemblies with a higher time constant, of the order of a second for example, this control being effected by placing the intake capacity (38) in communication with the output of the rotary compressor (32);

monitoring and control of the counter pressure reigning in the cavities (23) as a function of the power demanded with a long time constant of the order of 10 seconds for example.

6. Installation according to claim 1, further comprising a regulation system which includes, for the module or each module: means for systematically reducing the stroke of a pump injecting fuel into the Diesel chamber after each injection and means for then correcting the stroke by a possible increase in response to any discrepancy between a predetermined reference value of the outer dead center of said Diesel cycle free piston module and an actual value measured in the preceding operating cycle of said module.

7. Installation according to claim 1, comprising N modules (N being greater that 1), wherein the regulation system includes means for adjusting the fuel injection advance so as to slowly vary the frequency of (N−1) slave modules with respect to that of a master module and to obtain a phase shift of 2 n/N between the N modules with a time constant of several seconds.

* * * * *